United States Patent
Franz

(10) Patent No.: US 8,154,866 B2
(45) Date of Patent: Apr. 10, 2012

(54) SINGLE ROTOR DUCTED FAN

(75) Inventor: John P. Franz, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 137 days.

(21) Appl. No.: 12/762,738

(22) Filed: Apr. 19, 2010

(65) Prior Publication Data

US 2011/0255239 A1 Oct. 20, 2011

(51) Int. Cl.
*H05K 7/20* (2006.01)
*F04D 29/60* (2006.01)

(52) U.S. Cl. ............. 361/679.47; 361/679.48; 361/695; 415/211.2; 415/220

(58) Field of Classification Search .................. None
See application file for complete search history.

(56) References Cited

U.S. PATENT DOCUMENTS

| | | | | |
|---|---|---|---|---|
| 5,385,447 A | * | 1/1995 | Geister | 415/220 |
| 5,848,526 A | * | 12/1998 | Hanson | 60/226.1 |
| 6,045,327 A | * | 4/2000 | Amr | 415/211.2 |
| 7,048,499 B2 | * | 5/2006 | Mathson et al. | 415/119 |
| 7,304,844 B2 | * | 12/2007 | Jan et al. | 361/697 |
| 7,443,671 B2 | * | 10/2008 | Vinson et al. | 361/695 |
| 7,719,836 B2 | * | 5/2010 | Franz et al. | 361/695 |
| 7,775,767 B2 | * | 8/2010 | Takemoto et al. | 415/211.2 |
| 2002/0094271 A1 | * | 7/2002 | Yeuan et al. | 415/208.2 |
| 2004/0265126 A1 | * | 12/2004 | Bielesch et al. | 415/220 |
| 2008/0193287 A1 | * | 8/2008 | Kobayashi et al. | 415/208.2 |
| 2009/0110551 A1 | * | 4/2009 | Yoshida | 415/208.2 |

* cited by examiner

*Primary Examiner* — Boris Chervinsky

(57) ABSTRACT

In accordance with at least some embodiments, a single rotor ducted fan is disclosed. The single rotor ducted fan comprises a duct having an intake diameter and an impeller having a hub with blades that extend radially from the hub. The blades have a maximum tip diameter. The bellmouth diameter is less than the maximum tip diameter.

10 Claims, 6 Drawing Sheets

SINGLE ROTOR DUCTED FAN

BACKGROUND

Some electronic devices reach high levels of back pressure within the chassis or enclosure. For example, in a server enclosure with multiple compute nodes, these high levels of back pressure may be reached. Fans are often implemented to move air within electronic devices. However, existing fan designs are often inadequate or inefficient in an electronic device with high levels of back pressure.

BRIEF DESCRIPTION OF THE DRAWINGS

For a detailed description of exemplary embodiments of the invention, reference will now be made to the accompanying drawings in which.

Notation and Nomenclature

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1A:
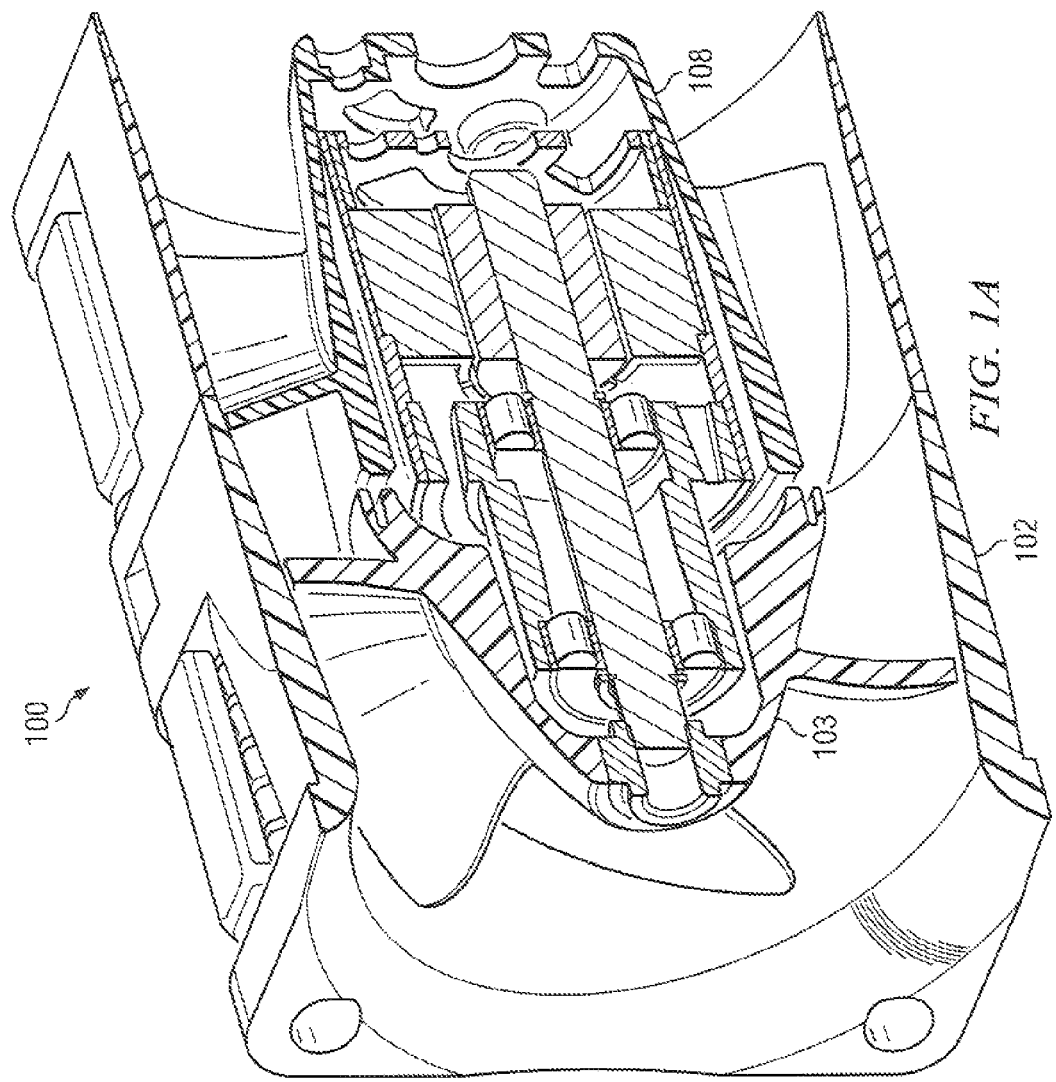
FIG. 1A illustrates an isometric cross-section of a single rotor ducted fan in accordance with an embodiment of the disclosure.

FIG. 1A shows an isometric cross-section of a single rotor ducted fan 100 in accordance with an embodiment of the disclosure. Single rotor ducted fan 100 comprises a duct 102, a stator 108 braced inside the duct 102, and an impeller 103 attached to the stator 108.

Figure 1B:
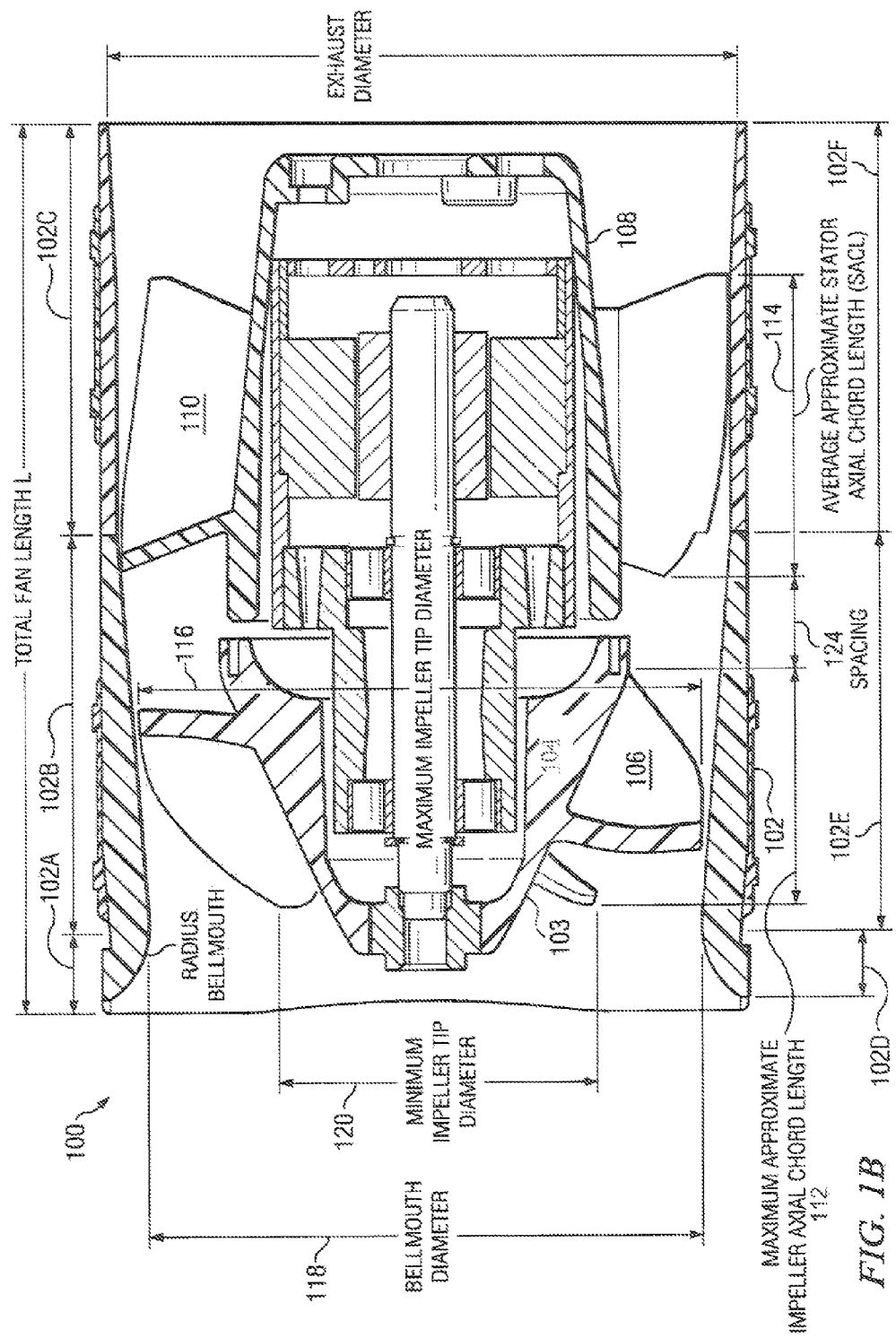
FIG. 1B illustrates a cross-section of a single rotor ducted fan in accordance with an embodiment of the disclosure.

FIG. 1B shows a cross-section of the single rotor ducted fan 100 in accordance with an embodiment of the disclosure. As shown in FIG. 1, the single rotor ducted fan 100 comprises an annular duct 102, an impeller 103 having a hub 104 and blades 106 that extend radially from the hub 104. The hub 104 is coupled to a stator 108 that is braced within the annular duct 102. In some embodiments the single rotor ducted fan is a 40 mm×56 mm fan. In some embodiments, the single rotor ducted fan 100 is implemented as a single rotor ducted fan unit that is compatible with a fan bay for a multi-node server enclosure or other electronic device.

Figure 1C:
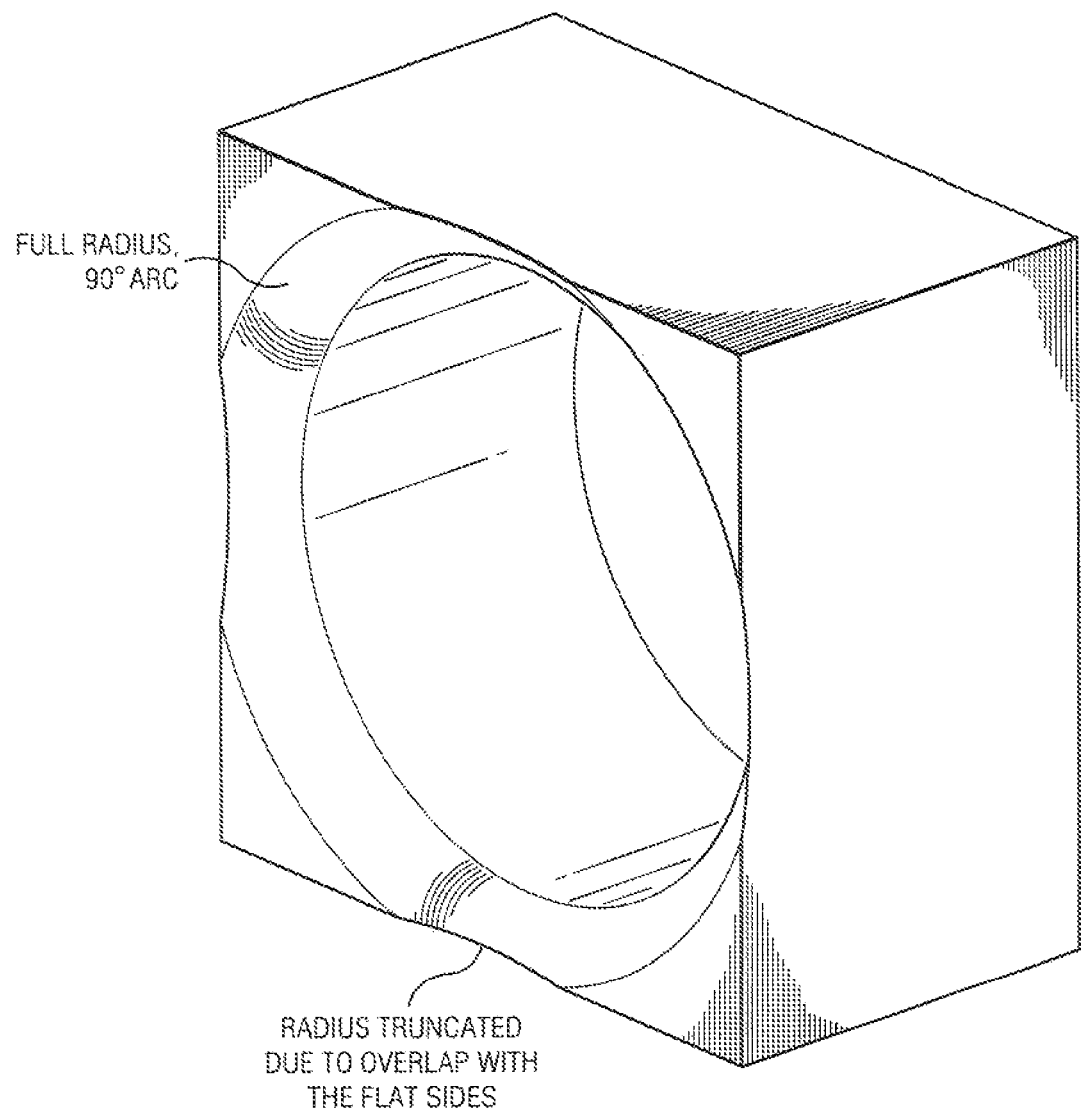
FIG. 1C is an isometric view of the bellmouth in an example embodiment of the invention.

Various sections of the annular duct 102 are shown as sections 102A-102F in FIG. 1B. Duct sections 102A and 102D are lip sections or bell-curve sections that define a bellmouth diameter 118. Duct sections 102A and 102D form a smooth rounded inlet. In some embodiments the rounded inlet is in the form of a radius. In some embodiments the radius turns through an angle of 90 degrees. FIG. 1C is an isometric view of the bellmouth in an example embodiment of the invention. FIG. 1C shows that in areas where the bellmouth overlaps the flat outer sides of the duct, the radius may be truncated.

Duct sections 102B and 102E extend from duct sections 102A and 102D respectively to increase the duct diameter from the bellmouth diameter to the exhaust diameter. In accordance with at least some embodiments, the increasing duct diameter between the bellmouth diameter and the exhaust diameter is linear (i.e., the shape of the annular duct 102 in the section corresponding to duct sections 102B and 102E is a conical frustum). Thus, duct section 102B increases radially with respect to the central axis in a linear manner from duct section 102A to duct section 102C. Likewise, duct section 102E increases radially with respect to the central axis in a linear manner from duct section 102D to duct section 102F.

The annular duct 102 also comprises a duct outlet with an exhaust diameter that is larger than the bellmouth diameter. The duct sections 102C and 102F extend from duct sections 102B and 102E respectively until terminating-at a duct outlet. In accordance with at least some embodiments, the duct sections 102C and 102F maintain the exhaust diameter while extending axially with respect to the central axis (i.e., the shape of the annular duct 102 in the portion corresponding to duct sections 102C and 102F is cylindrical). In other embodiments duct sections 102C and 102F may increase the duct diameter from the intermediate diameter to the exhaust diameter. In accordance with at least some embodiments, the increasing duct diameter between the intermediate diameter and the exhaust diameter is linear (i.e., the shape of the annular duct 102 in the section corresponding to duct sections 102C and 102F is a conical frustum). Thus, duct section 102C increases radially with respect to the central axis in a linear manner from duct section 102B to the exit diameter. Likewise, duct section 102F increases radially with respect to the central axis in a linear manner from duct section 102E to the exit diameter.

In some embodiments stator 108, stator vanes 110 and duct sections 102C and 102F are molded as a single solid piece. When molded as a single part, the inner diameter of duct sections 102C and 102F may have a slight angle or curve to aide in mold release.

As shown in FIG. 1B, the ducted fan 100 comprises an impeller 103 having a hub 104 and blades 106 that extend radially from the hub 104. Blades 106 have a minimum impeller tip diameter 120 at the inlet end or leading edge of impeller 103. Blades 106 have a maximum impeller tip diameter 116 on the outlet side or trailing edge of impeller 103. Because the maximum blade tip diameter 116 is towards the trailing edge of the fan, the impeller has rising impeller blade tips. In some embodiments, the maximum impeller blade tip diameter 116 is larger than the bellmouth diameter 118.

In accordance with at least some embodiments, certain dimensions of the mixed-flow ducted fan 100 may be determined with respect to a desired fan size or fan component length. For simplicity, the fan size may correspond to an exhaust diameter ("X") and the fan component length may correspond to the maximum axial chord length 112 of the impeller blades ("ACL"). In some embodiments the spacing 124 between the trailing edge of the impeller blades 106 and the leading edge of the stator vanes 110 is a function of the impeller maximum axial chord length (ACL) 112. In some embodiment spacing 124 is at least half the impeller maximum axial chord length (ACL) 112. In some embodiments spacing 124 is between 0.5 to 0.7 of the impeller maximum axial chord length (ACL) 112.

Stator vanes have an average axial chord length 114. The average stator axial chord length (SACL) 114 is also a function of the impeller maximum axial chord length (ACL) 112. In some embodiments the average stator axial chord length (SACL) 114 is at least half the impeller maximum axial chord length (ACL) 112. In some embodiments the average stator axial chord length (SACL) 114 is between 0.5 and 1.0 the impeller maximum axial chord length (ACL) 112.

Figure 1D:
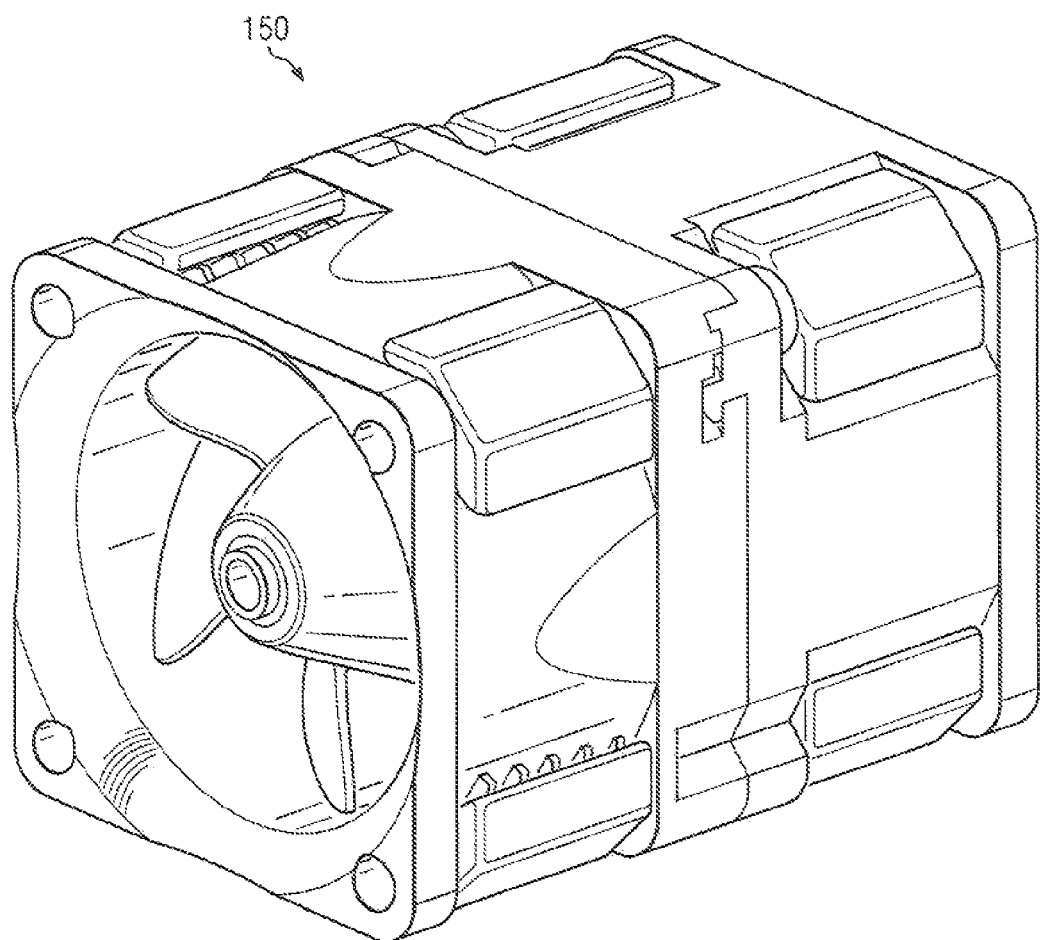
FIG. 1D illustrates an isometric view of a fan unit in accordance with an embodiment of the disclosure.

In accordance with at least some embodiments, the single rotor ducted fan 100 is part of a single rotor ducted fan unit. FIG. 1D is an isometric view of a single rotor ducted fan unit 150. The single rotor ducted fan unit may be compatible with a server rack fan bay or a blade server fan bay. Fan unit may comprise a mounting system used to mount the fan unit into the fan bay in the blade or a server rack or chassis. The single rotor ducted fan unit may also comprise a printed circuit (PC) board mounted external to the fan and used to control the fan. In other embodiments the PC board may be mounted inside the fan.

Figure 2:
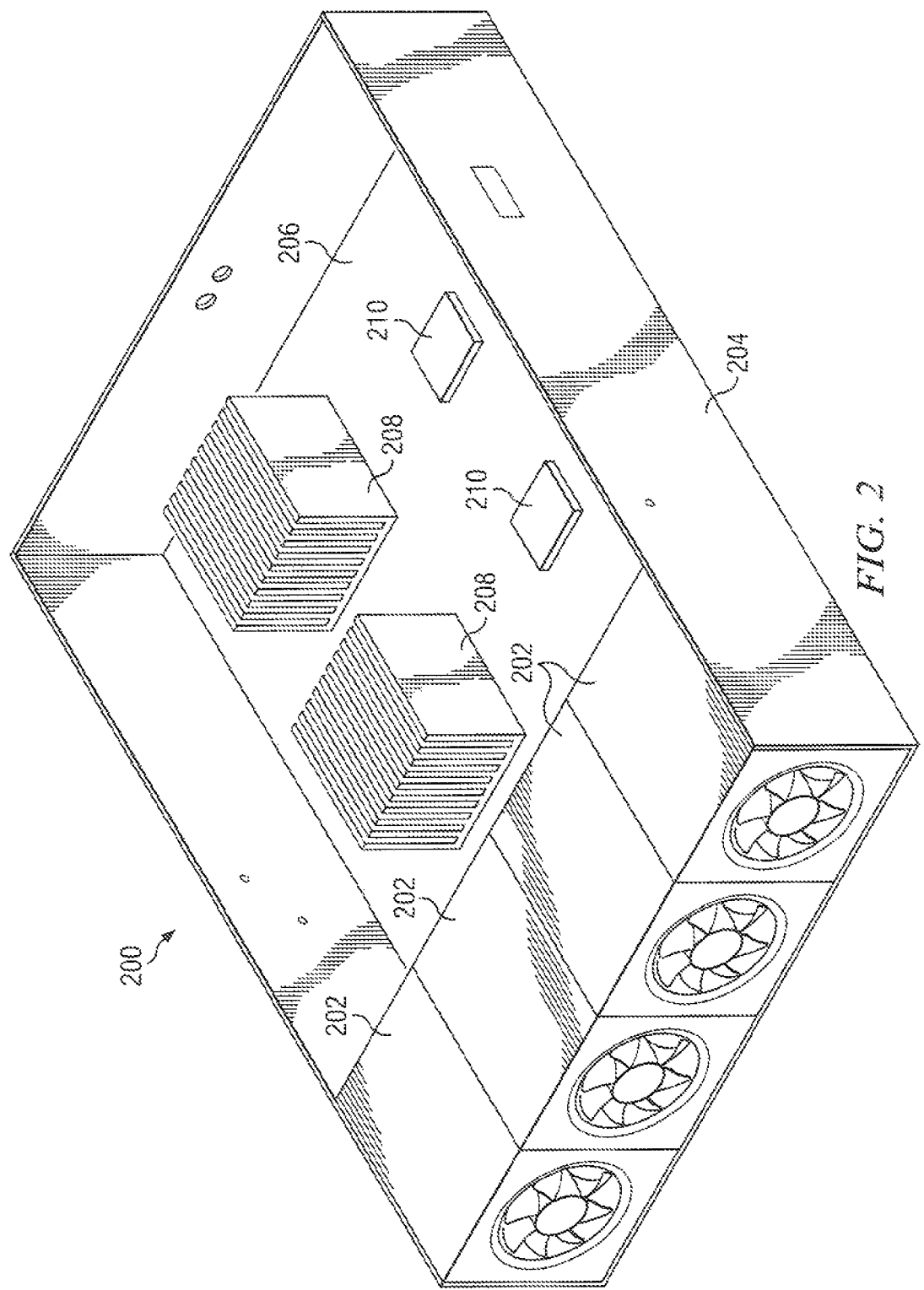
FIG. 2 illustrates a blade server architecture in accordance with an embodiment of the disclosure.

FIG. 2 illustrate a blade server architecture 200 in accordance with an embodiment of the disclosure. More specifically, FIG. 2 illustrates an isometric view of the blade server architecture 200. As shown in FIG. 2, the blade server architecture 200 comprises a blade enclosure 204, a PC board 206 mounted in the blade enclosure 204, memory 208 and processors 210 mounted on PC board 206, and a plurality of fan units 202 mounted along the front edge of enclosure 204. In operation, one or more blade enclosures 204 will typically be mounted into a server rack. In other embodiments, fan units 202 may mount directly into bays in the server rack.

Figure 3:
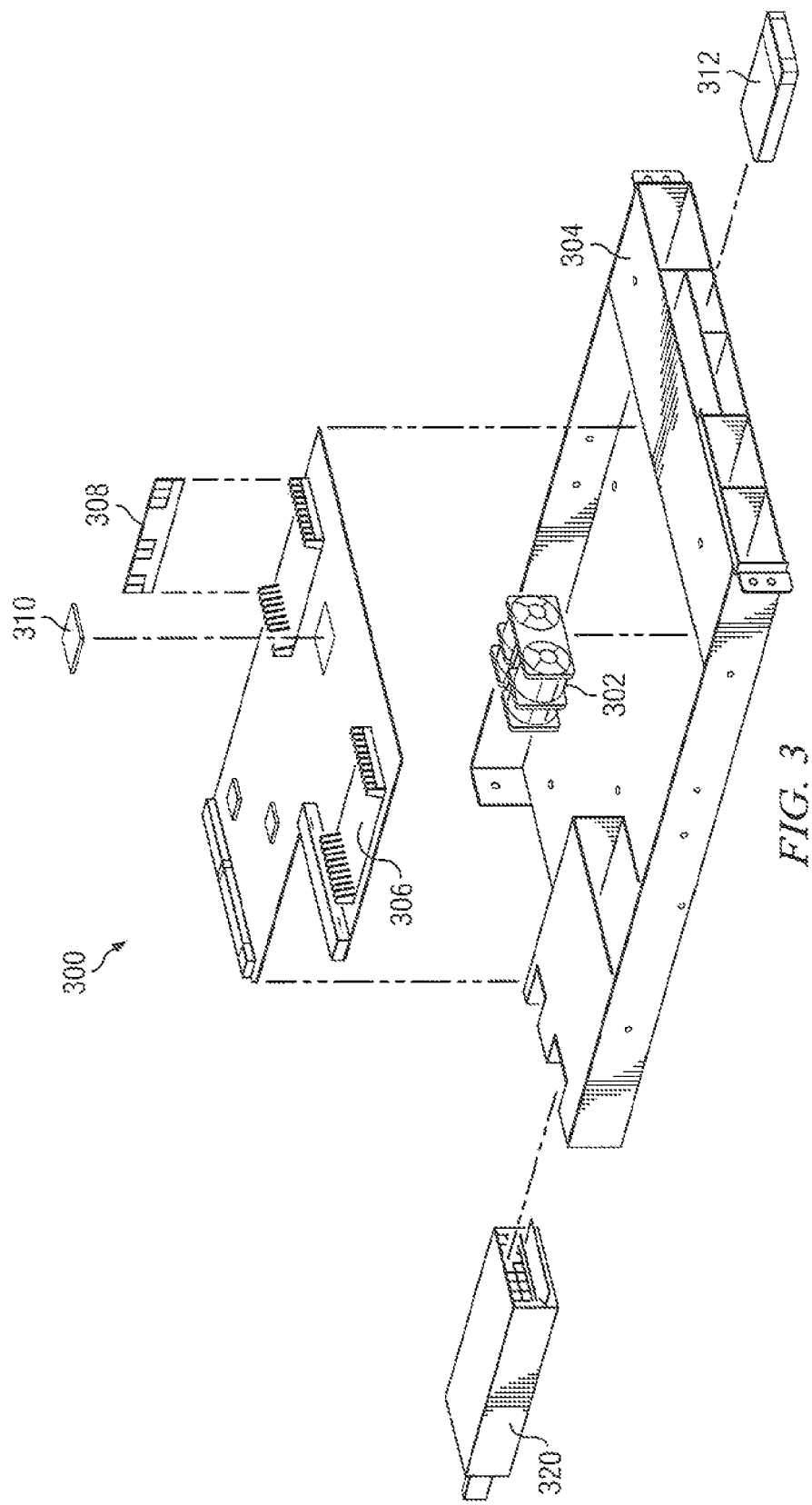
FIG. 3 illustrates another blade server architecture in accordance with an embodiment of the disclosure.

FIG. 3 illustrates another blade server architecture 300 in accordance with an embodiment of the disclosure. More specifically, FIG. 3 illustrates an exploded isometric view of the blade server architecture 300. As shown in FIG. 3, the blade server architecture 300 comprises blade enclosure 304, PC board 306, one or more power supplies 320, one or more processors 310, memory 308, one or more hard drives 312, and one or more fan units 302. In this example embodiment, fan units 302 mount internal to the blade enclosure 304. Power supply 320 and hard drive 312 may be generally called a resource unit. Blade enclosure 304 has a plurality of resource unit bays into which resource units can be inserted. In other embodiments, resource units may plug directly into resources unit bays in a server rack.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer system, comprising:
   an enclosure configured to hold at least one processor; and
   a plurality of single rotor ducted fans units selectively attached to the enclosure, wherein each single rotor ducted fan unit comprises a duct having an bellmouth diameter, and an impeller positioned inside the duct, the impeller having a hub and blades that extend radially from the hub, the blades having a maximum tip diameter;
   wherein the bellmouth diameter is less than the maximum tip diameter; and
   a stator braced within the duct and coupled to the impeller, the stator having stator vanes that extend radially from the stator, wherein a minimum axial chord length of the stator vanes is between 0.5 and 1.0 times an axial chord length of the impeller blades.

2. The computer system of claim 1 wherein the enclosure is a blade enclosure with a plurality of resource unit bays and with a plurality of fan bays compatible with the plurality of single rotor ducted fans units.

3. The computer system of claim 1, wherein the bellmouth diameter is formed by a radius that defines a non-conical shape at an inlet of the duct.

4. The computer system of claim 1, wherein the maximum tip diameter of the impeller blades is at a trailing edge of the impeller blades and where a minimum tip diameter of the impeller blades is at a leading edge of the impeller blades.

5. The computer system of claim 1, further comprising:
   a stator braced within the duct and coupled to the impeller, the stator having stator vanes that extend radially from the stator, wherein a spacing between a trailing edge of the impeller blades and a leading edge of the stator vanes is between 0.5 to 0.7 times an axial chord length of the impeller blades.

6. The computer system of claim 3, wherein the radius turns through an angle of 90 degrees at least in one section of the bellmouth diameter.

7. A single rotor ducted fan, comprising:
   a duct having a bellmouth diameter and an exhaust diameter, wherein the bellmouth diameter is formed by a radius that defines a non-conical shape at an inlet of the duct, and where the bellmouth diameter is less than the exhaust diameter; and
   a impeller inset within the duct between the bellmouth diameter and the exhaust diameter, the impeller having a hub and blades that extend radially from the hub, the blades having a maximum tip diameter, wherein the bellmouth diameter is less than the maximum tip diameter; and
   a stator braced within the duct and coupled to the impeller, the stator having stator vanes that extend radially from the stator, wherein a minimum axial chord length of the stator vanes is between 0.5 and 1.0 times an axial chord length of the impeller blades.

8. The single rotor ducted fan of claim 7, wherein the maximum tip diameter of the impeller blades is at a trailing edge of the impeller blades and where a minimum tip diameter of the impeller blades is at a leading edge of the impeller blades and where the minimum tip diameter is smaller than the maximum tip diameter.

9. The single rotor ducted fan of claim 7, further comprising:
   a stator braced within the duct and coupled to the impeller, the stator having stator vanes that extend radially from the stator, wherein a spacing between a trailing edge of the impeller blades and a leading edge of the stator vanes between 0.5 to 0.7 times an axial chord length of the impeller blades.

10. The single rotor ducted fan of claim 7, further comprising:

a mounting system attached to the duct, wherein mounting system mates with a fan bay in a computer blade enclosure.

* * * * *

UNITED STATES PATENT AND TRADEMARK OFFICE
CERTIFICATE OF CORRECTION

| | | |
|---|---|---|
| PATENT NO. | : 8,154,866 B2 | Page 1 of 1 |
| APPLICATION NO. | : 12/762738 | |
| DATED | : April 10, 2012 | |
| INVENTOR(S) | : John P. Franz | |

It is certified that error appears in the above-identified patent and that said Letters Patent is hereby corrected as shown below:

In column 5, line 3, in Claim 9, before "between" insert -- is --.

Signed and Sealed this
Eleventh Day of December, 2012

David J. Kappos
*Director of the United States Patent and Trademark Office*